United States Patent
Coatesworth et al.

[19]

[11] Patent Number: 6,085,730
[45] Date of Patent: Jul. 11, 2000

[54] METHOD FOR IMPROVED FUEL DELIVERY FOR MULTI-PORT FUEL INJECTION SYSTEM

[75] Inventors: Timothy A. Coatesworth, Orion; Greg T. Weber, Commerce, both of Mich.; John N. Oenick, Vero Beach, Fla.; Brian E. Beechie, Farmington Hills, Mich.; Jeff C. Ehlers, Neenah, Wis.

[73] Assignee: Chrysler Corporation, Auburn Hills, Mich.

[21] Appl. No.: 09/212,869

[22] Filed: Dec. 16, 1998

[51] Int. Cl.$^7$ ..................................................... F02D 41/34
[52] U.S. Cl. ........................... 123/480; 123/478; 123/490
[58] Field of Search .................... 123/478, 480, 123/490, 492; 701/104, 105

[56] References Cited

U.S. PATENT DOCUMENTS

| | | | |
|---|---|---|---|
| 4,532,907 | 8/1985 | Buglione et al. | 123/490 |
| 4,724,816 | 2/1988 | Kanno et al. | 123/490 |
| 5,003,952 | 4/1991 | Weglarz et al. | 123/478 |
| 5,003,953 | 4/1991 | Weglarz et al. | 123/478 |
| 5,261,366 | 11/1993 | Regueiro | 123/299 |
| 5,427,071 | 6/1995 | Thomas et al. | 123/491 |
| 5,427,082 | 6/1995 | Thomas et al. | 123/675 |
| 5,435,285 | 7/1995 | Adams et al. | 123/492 |
| 5,467,593 | 11/1995 | Vincent et al. | 60/274 |
| 5,469,826 | 11/1995 | Thomas et al. | 123/488 |
| 5,492,102 | 2/1996 | Thomas et al. | 123/493 |
| 5,495,841 | 3/1996 | Gillbrand et al. | 123/480 X |

*Primary Examiner*—Tony M. Argenbright
*Attorney, Agent, or Firm*—Mark P. Calcaterra

[57] ABSTRACT

A method for improving the transient response of a multi-port fuel injection system wherein the delivery of a pulse to an injector is fragmented into a variable number of pulse fragments and the delivery of the pulse fragments to the injector is spaced throughout a respective fueling window. The magnitude and delivery angle of each of the pulse fragments is variable and depends upon the current engine operating conditions. Calculations of the magnitude of each pulse fragment are based upon a constantly recalculated total pulse width.

15 Claims, 5 Drawing Sheets

6,085,730

METHOD FOR IMPROVED FUEL DELIVERY FOR MULTI-PORT FUEL INJECTION SYSTEM

BACKGROUND OF THE INVENTION

1. Field of the Invention

The present invention relates to a method of electronic fuel injection control for an internal combustion engine. More particularly, the present invention relates to a method for fuel injection control which causes fuel to be delivered through a variable number of pulse fragments, wherein the width of each pulse fragment is based upon the current engine operating conditions and each pulse fragment is delivered at a variable delivery angle which is also dependant upon the current engine operating conditions.

2. Related Art

Modern automotive engines typically employ one or more fuel injectors for delivering fuel from a fuel source to the cylinders of an internal combustion engine. In electronically controlled fuel injection systems, the fuel injectors are generally operated by electronic pulses which cause the respective fuel injector to dispense an amount of fuel in proportion to the width of the pulse.

Conventionally, the pulse width for an injector is calculated once in response to various engine dynamics which include throttle position, engine speed, manifold pressure, airflow, temperature and the level of oxygen in the exhaust. Although the delivery of fuel could take place over a range of acceptable crankshaft positions (hereinafter referred to as the fueling window), the delivery of the pulse is commonly timed to a specific crankshaft position within the fueling window. Typically, the pulse width calculation is performed well in advance of the time at which the pulse is to be delivered; the pulse is generally delivered at an early point within the fueling window.

While these prior arts methods have performed well under steady-state conditions, several problems have been noted with their response to transient conditions, such as changes in throttle position. When the throttle is rapidly closed, for example, these prior art fueling methods will cause the engine to be fueled with excess fuel since the width of the pulses had been based upon a previous, more open throttle position. As such, the engine will experience a rich-burn condition which adversely affects fuel economy and exhaust emissions.

Similarly, when the throttle is opened rapidly, these prior art fueling methods will cause an insufficient level of fuel to be delivered to the engine for combustion since the width of the pulses had been based upon a previous, more closed throttle position. As such, the engine will experience a lean-burn condition which adversely affects exhaust emissions.

Improved methods, such as the one in commonly owned U.S. Pat. No. 5,003,953, have been disclosed. This method, for example, generates a second pulse in response to a rapidly opening throttle. The width of the second pulse is calculated subsequent to the delivery of the primary pulse and is delivered so as to coincide with the termination of the fueling window. While this method has been successful in improving the fuel economy and exhaust emissions, several problems have been noted. As with the other prior art methods, this method is not capable of causing a reduction in the level of fuel delivered to the engine in response to the detection of a rapidly closing throttle. Also, the delivery of the second pulse at the end of the fueling window without regard to various other engine dynamics can be detrimental to exhaust emissions.

Consequently, there remains a need in the art for a method for controlling the amount and timing of fuel delivered by a multi-port fuel injection system that improves the transient response of the system during times where the fueling requirements are increasing or decreasing so as to improve performance and emissions.

BRIEF SUMMARY OF THE INVENTION

It is therefore an object of the present invention to provide a method for controlling the amount and timing of fuel delivered by a multi-port fuel injection system which improves the transient response of the system.

More specifically, it is an object of the present invention to provide a method which improves the transient response of a fuel injection system through the use of multiple pulse fragments spaced throughout a fueling window.

It is another object of the present invention to provide a method of fuel injection which utilizes a variable number of pulse fragment to control the fueling of an individual cylinder of the engine.

It is a further object of the present invention to provide a method which enables a reduction in the level of fuel delivered to the engine in a fueling window in response to the detection of certain predefined engine conditions, such as a rapidly closing throttle.

It is yet another object of the present invention to reduce the magnitude of standing waves in a fuel line which result from the delivery of fuel in a 'pulse-like' manner through the fuel injectors by varying the delivery angle of at least one pulse fragment.

The method of the present invention achieves improved transient response through the continuous recalculation of the pulse width, the fragmented delivery of the pulse width to the injector and through variation of the relative angle (i.e., relative position of the crankshaft) that is used to deliver the pulse fragments. Fragmented delivery utilizes a variable number of pulses to change the amount of fuel being delivered by an injector during the fueling window.

In operation, a total calculated pulse width (CPW) which is based upon the current engine operating conditions is continuously recalculated. A value of the CPW is obtained and depending upon the current engine operating conditions, the first pulse fragment may either be eliminated or a portion of CPW may be allocated to the first pulse fragment. The delivery angle for each pulse fragment is also calculated and can contain an offset angle to reduce the magnitude of standing waves in the fuel line. The delivery angles are related to both the configuration of the engine (e.g., placement of the fuel injectors, air-flow dynamics in the intake manifold) and to various engine operating conditions, such as engine speed. Unless eliminated, the first pulse fragment is then delivered according to its corresponding delivery angle.

A new value of CPW is then obtained for the current engine operating conditions. Depending upon these conditions, the second pulse fragment may either be eliminated or provided with a portion of CPW. Unless eliminated, the second pulse fragment is then delivered according to its corresponding delivery angle.

The method then repeats the steps of the preceding paragraph for each remaining pulse fragment to be delivered within the current fueling window, with each calculation being based upon a newly calculated CPW. After the last pulse fragment for the current fueling window has been either eliminated or delivered, the methodology repeats all of the above steps for each subsequent fueling window.

Additional advantages and features of the present invention will become apparent from the subsequent description and the appended claims, taken in conjunction with the accompanying drawings.

DETAILED DESCRIPTION OF THE DRAWINGS

Figure 1:
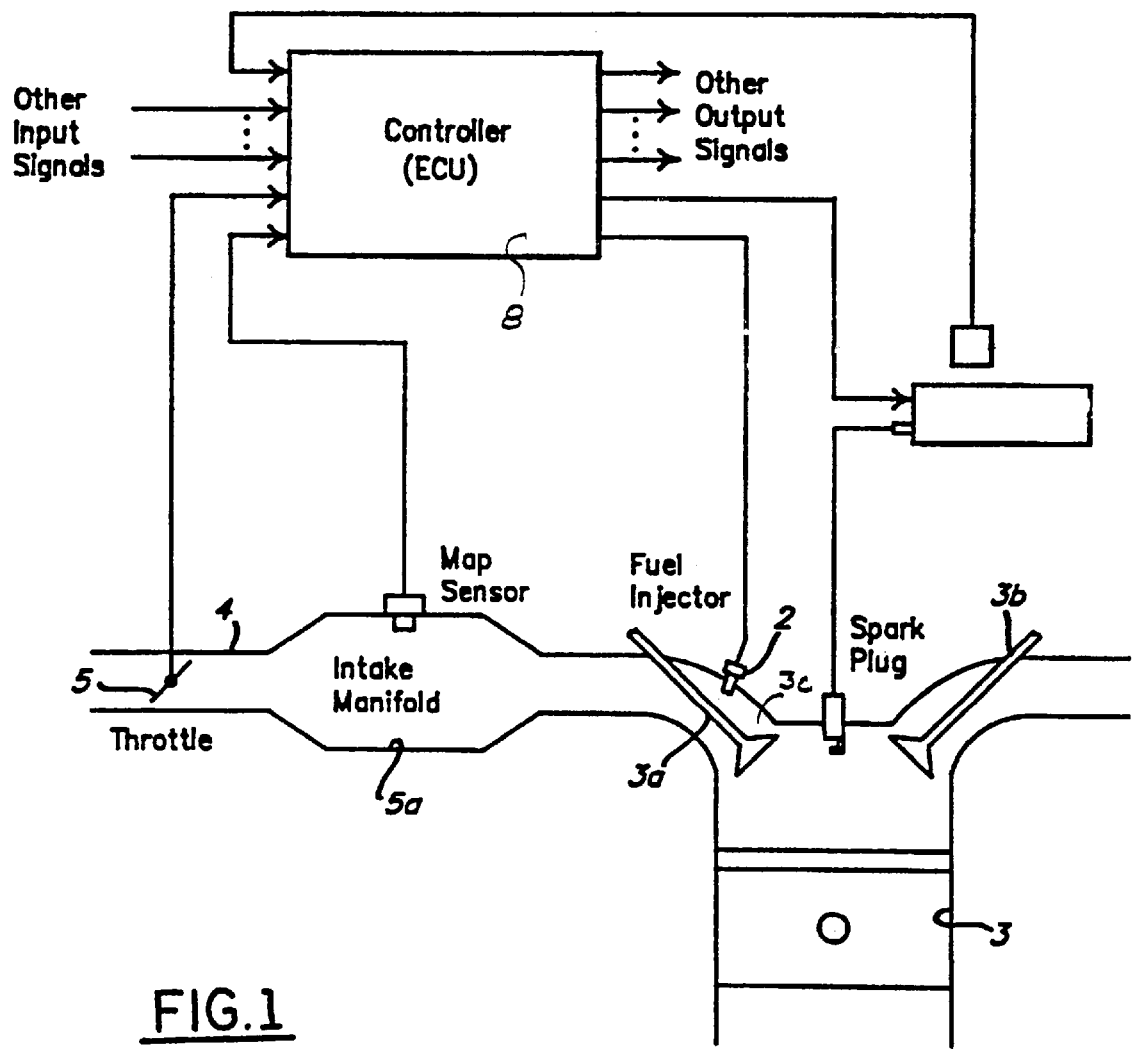
FIG. 1 is a schematic view of a fuel injection system incorporating the present invention.

Referring to FIG. 1, a schematic view of a fuel injection system 1 for a four-stroke internal combustion engine is shown. Under normal operating conditions, fuel is delivered from a fuel source through fuel lines to fuel injectors 2. The fuel injectors 2 are conventional and inject fuel from the fuel lines into the intake port 3c to provide fuel to an individual cylinder 3 of the internal combustion engine. In the preferred embodiment, the engine has at least one cylinder 3 and at least one fuel injector 2 per cylinder. Each cylinder also has an intake valve 3a and an exhaust valve 3b which are conventional. The fuel injection system 1 also includes a throttle body 4 having a throttle valve 5. The throttle valve 5 is operable at a fully opened position, a fully closed position, or any position therebetween for allowing or preventing air to enter an intake manifold 5a and flow to the cylinders 3 of the engine. Fuel from fuel injectors 2 is mixed with air in a known manner.

Various sensors are electrically connected to an electronic control unit (ECU) 8 which includes memory. These sensors include transducers or sensors which monitor various engine parameters such as engine temperature (TMP), engine speed (RPM), engine position, engine manifold absolute pressure (MAP), air flow, the level of oxygen in the exhaust gases, etc. The fuel injectors 2 are also electrically connected to the ECU 8 which outputs a signal (i.e., pulse fragment) to cause the fuel injectors 2 to dispense fuel. The ECU 8 is operable for continuously calculating a desired fuel injector "ON" time (i.e., total pulse width) in response to the current engine operating conditions. A current value of the total pulse width is used to calculate the width of each pulse fragment just prior to its delivery, thus improving the transient response of the fuel injection system. The ECU 8 is also operable for setting a mode flag in response to the detection of a predetermined engine condition such as a rapidly decreasing fueling requirement (deceleration mode flag).

In the method of the present invention, a variable number of pulse fragments are used to cause fuel injector 2 to dispense fuel to individual cylinder 3. In any given fueling window, the number of pulse fragments delivered can vary between zero and a predetermined maximum and is dependent upon the current engine operating conditions. However, in the preferred embodiment, a maximum of three pulse fragments are used in any given fueling window. It should be noted that the angular duration of the fueling window is dependant upon the engine type. For example, modern gasoline-powered automotive engines are typically of the four-stroke type and hence their fueling window would have a duration of 720°. A two-stroke engine would have a fueling window with a duration of 360°.

The timing of the delivery of each of the pulse fragments is also variable and is controlled in relation to the relative angular position of the crankshaft. Optimal delivery angles are initially derived through a series of dynamometer tests designed to balance the factors of performance, fuel economy and emissions in response to a given set of engine operating conditions. The optimal delivery angles are then stored in ECU 8 in tabular form, allowing the ECU 8 to select the delivery angles according to the current engine operating conditions. Additionally, ECU 8 could be programmed to modify or adjust the selected delivery angles in view of the current engine conditions. For example, ECU 8 could reduce the delivery angles if the engine were operated at a speed that exceeded the engine speed at which the tabled values were derived. As another example, ECU 8 could modify the delivery angles so as to reduce the magnitude of the standing waves in the fuel line(s) that result from the pulsing of fuel through the fuel line. This modification could be accomplished through the addition of an offset angle to at least one pulse fragment delivered to each of the cylinders 3. The offset angle corresponding to each cylinder could be a predetermined number, a variable number depending upon the current engine conditions or a random number.

Figure 2:
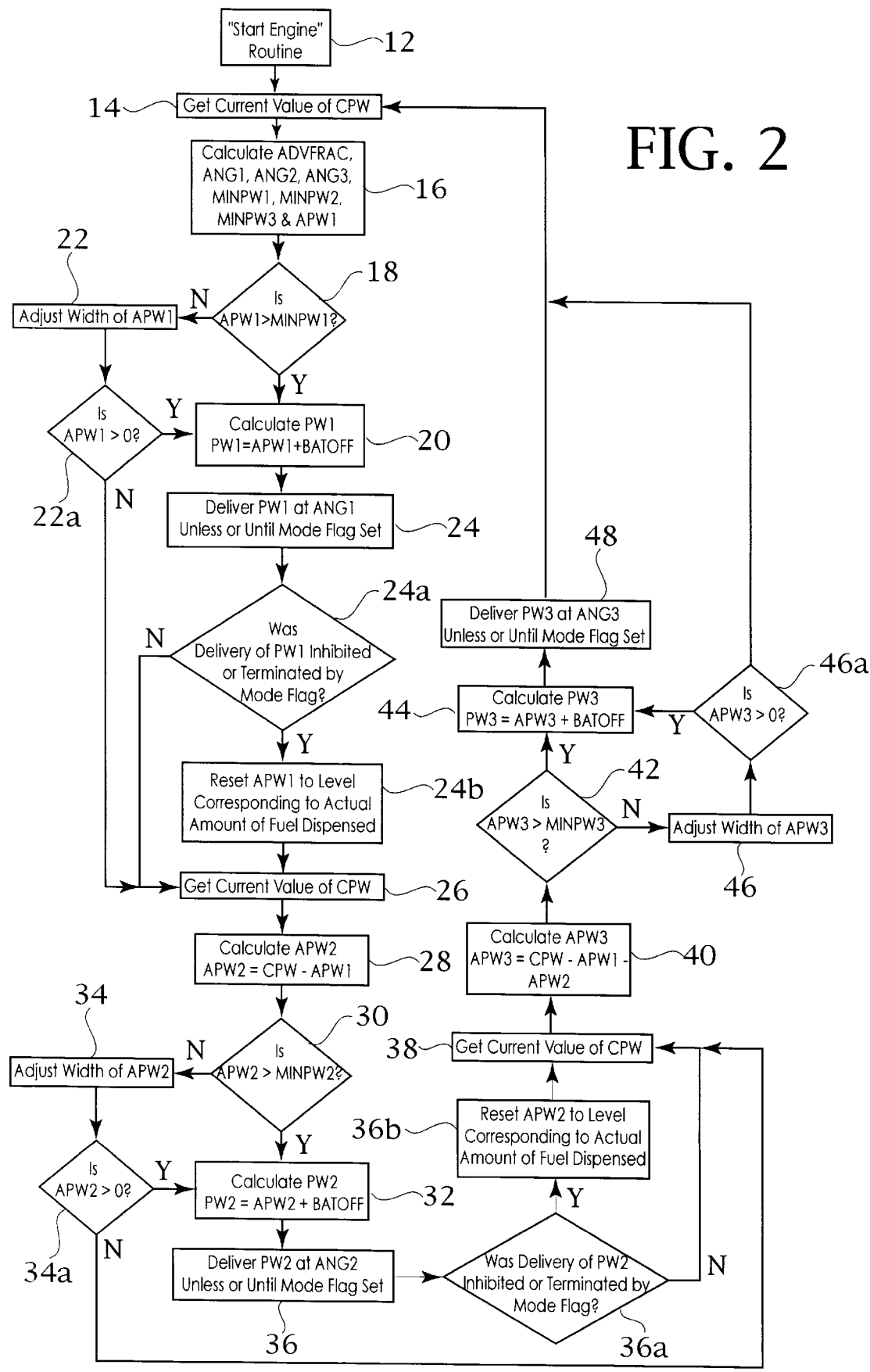
FIG. 2 is a flowchart of a method of firing fuel injectors according to the present invention.

Referring to FIG. 2, a flowchart for firing injectors in a multi-port fuel injection system according to the preferred embodiment of the present invention is shown. At block 12, the engine is started through the use of a start routine. The use of a start routine is needed as the several variables, such as engine position, are unknown and as such, the criteria for fueling the engine is substantially different. Depending upon the particular application, the start routine may only apply until the needed variables have been quantified (e.g., a partial rotation of the crankshaft) or may continue until the engine has been fully started and achieved some predefined criteria (e.g., minimum engine speed). Subsequent to the completion of the start routine, the methodology begins the fuel delivery routine in block 14. In block 14, the methodology acquires a value of the desired fuel injector "ON" time or total calculated pulse width (CPW) which is representative of the current engine operating conditions, preferably including the amount of fuel which has already been delivered during the current fueling window. The ECU 8 calculates CPW from the values provided by the sensors or transducers monitoring TMP, RPM, MAP, etc. CPW is then stored by ECU 8 in memory for further use. The methodology then proceeds to block 16.

In block 16, the methodology then determines the advance fraction (ADVFRAC) which relates to the current engine operating conditions. The advance fraction is the fractional amount of the total calculated pulse width that will be allocated to the theoretical first pulse fragment (APW1). The value of ADVFRAC is determined by cross-referencing one or more aspects of the current engine operating condition against a predefined matrix; the actual value of ADVFRAC can vary from 0 to 100% depending upon the selection criteria (i.e., current engine operating conditions). The value of APW1 is then calculated by multiplying CPW by ADVFRAC (i.e., APW1=ADVFRAC×CPW); APW1 is then stored in memory for further use.

Also performed in block 16 are calculations for the angle of delivery and minimum pulse fragment width for each pulse fragment to be delivered. As the preferred embodiment utilizes up to three pulse fragments, three delivery angles (i.e., ANG1, ANG2 & ANG3) as well as three minimum pulse widths (i.e., MINPW1, MINPW2 & MINPW3) will be calculated.

Minimum pulse widths relate to a calculated minimum width of a pulse fragment in view of the capabilities of the fuel injector and the current fueling requirements of the engine. Typically, low-volume flow of fuel from a fuel injector is neither linear nor repeatable. As the volume delivered by the fuel injector is increased (i.e., as the width of the pulse fragment increases), the flow maintains its non-linear characteristic but becomes repeatable. The value of the pulse width at which the flow becomes repeatable is stored in ECU 8 and may be used as the sole criteria for establishing the minimum size of the pulse fragments. Preferably, however, the minimum fueling requirements of individual cylinder 3 during the 720° fueling window are also considered. For example, the minimum pulse width of at least one of the pulse fragments could be the sum of the value stored in ECU 8 and the difference between the minimum amount of fuel to be delivered during a 720° fueling window and the amount of fuel actually dispensed.

The methodology then proceeds to decision block 18 where the value of first pulse fragment, APW1, is compared against its corresponding minimum calculated pulse width, MINPW1. If the value of APW1 is greater than the value of MINPW1, the methodology proceeds to block 20. If the value of APW1 is less than the value of MINPW1, the methodology proceeds to block 22 where the value of APW1 is reset in the desired manner. In the preferred embodiment, if APW1 is smaller than MINPW1, it is reset to a width of zero. In an alternate embodiment, if APW1 is smaller than MINPW1, it is reset to a width equal to the minimum pulse width (i.e., if APW1<MINPW1, then set APW1=MINPW1). Once the value of APW1 is reset, the new value is stored for further use and the methodology proceeds to decision block 22a. In decision block 22a, the value of APW1 is checked to determine if it greater than zero. If APW1 is greater than zero, the method proceeds to block 20. If APW1 is less than zero, the method proceeds to block 26. It should be noted that while the logic represented by decision blocks 22a, 34a & 46a are not truly necessary, they are representative of the industry practice to avoid causing ECU 8 to perform unnecessary calculations or operations. It should also be noted that decision blocks 22a, 34a & 46a have been included as such for purposes of convenience and in an attempt to avoid a multiplicity of drawing figures. It should be readily apparent to those skilled in the art as to the several ways that decision blocks 22a, 34a & 46a could be eliminated once a particular embodiment for the making adjustments to APW1 based on MINPW1 has been selected.

At block 20, the methodology calculates the actual width of the first pulse fragment (PW1). As conventional fuel injectors 2 include solenoid-operated, spring-biased valves, this calculation is necessary to account for certain time delays (BATOFF) that occur with the operation of the injector which affect the amount of fuel delivered to an individual cylinder 3. These time delays are typically associated with the growth or decay of the magnetic field in the solenoid and the speed with which the force generated by the magnetic field increases or abates relative to the force exerted by the biasing spring. In application, the time delay associated with the growth of the magnetic field causes fuel delivery to lag behind the leading edge of the pulse fragment. Similarly, the time delay associated with the decay of the magnetic field causes fuel to continue to be dispensed after the trailing edge of the pulse fragment. Generally, these delays are a function of the magnitude of the voltage of the electrical source that provides the electricity for the pulse fragment and the temperature of the fuel injector solenoid. Calculation of PW1 is performed by adding BATOFF to APW1 (i.e., PW1=APW1+BATOFF). The methodology then proceeds to block 24.

In block 24, the methodology provides that PW1 is fired when the crankshaft is positioned to ANG1 unless or until the mode flag is set by the ECU. This effectively inhibits the delivery of the pulse fragment if the mode flag is set in advance of its delivery or terminates the delivery of the pulse fragment if the mode flag is set while it is being delivered. The methodology then proceeds to decision block 24a.

In decision block 24a, the methodology determines whether the mode flag had been set prior to or during the delivery of the first pulse fragment. If the mode flag had not been set prior to or during the delivery of the first pulse fragment, the methodology will proceed to block 26. If the mode flag had been set, the methodology then proceeds to block 24b where the stored value of APW1 is adjusted to reflect the amount of fuel actually dispensed. This adjustment will cause APW1 to correlate to either a value of zero (0) if the mode flag had been set prior to the delivery or to a value of the delivered pulse width minus BATOFF if the delivery had been terminated prematurely by the mode flag. The methodology will then proceed to block 26.

In block 26, the methodology acquires a new value for the total calculated pulse width which is representative of the current engine operating conditions and stores this value as CPW. The methodology then proceeds to block 28 where the new value of CPW is used to calculate the width of the second theoretical pulse fragment (APW2). APW2 is calculated by subtracting APW1 from CPW (i.e., APW2=CPW−APW1). The value of APW2 is then stored in memory.

The methodology then proceeds to decision block 30 where the value of APW2 is compared against its corresponding minimum calculated pulse width, MINPW2. If the value of APW2 is greater than the value of MINPW2, the methodology proceeds to block 32. If the value of APW2 is less than the value of MINPW2, the methodology proceeds to block 34 where the value of APW2 is reset in the desired manner. As with APW1, the width of the pulse fragment is reset to zero in the preferred embodiment or to the value of MINPW2 in the alternate embodiment. Once this new value for APW2 has been stored, the method proceeds to decision block 34a where APW2 is checked to determine if it is greater than zero. If APW2 is greater than zero, the method proceeds to block 32. If APW2 is less than zero, the method proceeds to block 38.

At block 32, the methodology calculates the width of the second pulse fragment (PW2). Calculation of PW2 is performed by adding BATOFF to APW2 (i.e., PW2=APW2+BATOFF). The methodology then proceeds to block 36.

In block 36, the methodology provides that PW2 is timed to fire so as a crankshaft position of ANG2 coincides with the trailing edge of the pulse fragment unless or until the mode flag is set by the ECU. This effectively inhibits the delivery of the pulse fragment if the mode flag is set in advance of its delivery or terminates the delivery of the pulse fragment if the mode flag is set while it is being delivered. Alternatively, the delivery of PW2 could be timed to fire according to its leading edge, or the decision to use the leading or trailing edge could be based upon the current engine operating conditions. The methodology then proceeds to decision block 36*a*.

In decision block 36*a*, the methodology determines whether the mode flag had been set prior to or during the delivery of the second pulse fragment. If the mode flag had not been set prior to or during the delivery of the second pulse fragment, the methodology will proceed to block 38. If the mode flag had been set, the methodology then proceeds to block 36*b* where the stored value of APW2 is adjusted to reflect the amount of fuel actually dispensed. This adjustment will cause APW2 to correlate to either a value of zero (0) if the mode flag had been set prior to the delivery or to a value of the delivered pulse width minus BATOFF if the delivery had been terminated prematurely by the mode flag. The methodology will then proceed to block 38.

In block 38, the methodology acquires a new value for the total calculated pulse width which is representative of the current engine operating conditions and stores this value as CPW. The methodology then proceeds to block 40 where the new value of CPW is used to calculate the width of the third theoretical pulse fragment (APW3). APW3 is calculated by subtracting APW1 and APW2 from CPW (i.e., APW3= CPW−APW1−APW2). The value of APW3 is then stored in memory.

The methodology then proceeds to decision block 42 where the value of APW3 is compared against its corresponding minimum calculated pulse width, MINPW3. If the value of APW3 is greater than the value of MINPW3, the methodology proceeds to block 44. If the value of APW3 is less than the value of MINPW3, the methodology proceeds to block 46 where the value of APW3 is reset in the desired manner. As with APW1 and APW2, the width of the pulse fragment is reset to zero in the preferred embodiment or to the value of MINPW3 in the alternate embodiment. Once this new value for APW3 has been stored, the method proceeds to decision block 46*a* where APW3 is checked to determine if it is greater than zero. If APW3 is greater than zero, the method proceeds to block 44. If APW3 is less than zero, the method returns to block 14.

At block 44, the methodology calculates the width of the third pulse fragment (PW3). Calculation of PW3 is performed by adding BATOFF to APW3 (i.e., PW3=APW3+ BATOFF). The methodology then proceeds to block 48.

In block 48, the methodology provides that PW3 is timed to fire so as a crankshaft position of ANG3 coincides with the trailing edge of the pulse fragment unless or until the mode flag is set by the ECU. Again, this effectively inhibits the delivery of the pulse fragment if the mode flag is set in advance of its delivery or terminates the delivery of the pulse fragment if the mode flag is set while it is being delivered. With the fueling of the current 720° fueling window complete, the methodology then returns to block 14 to begin the fueling of the next 720° fueling window.

Figure 3:
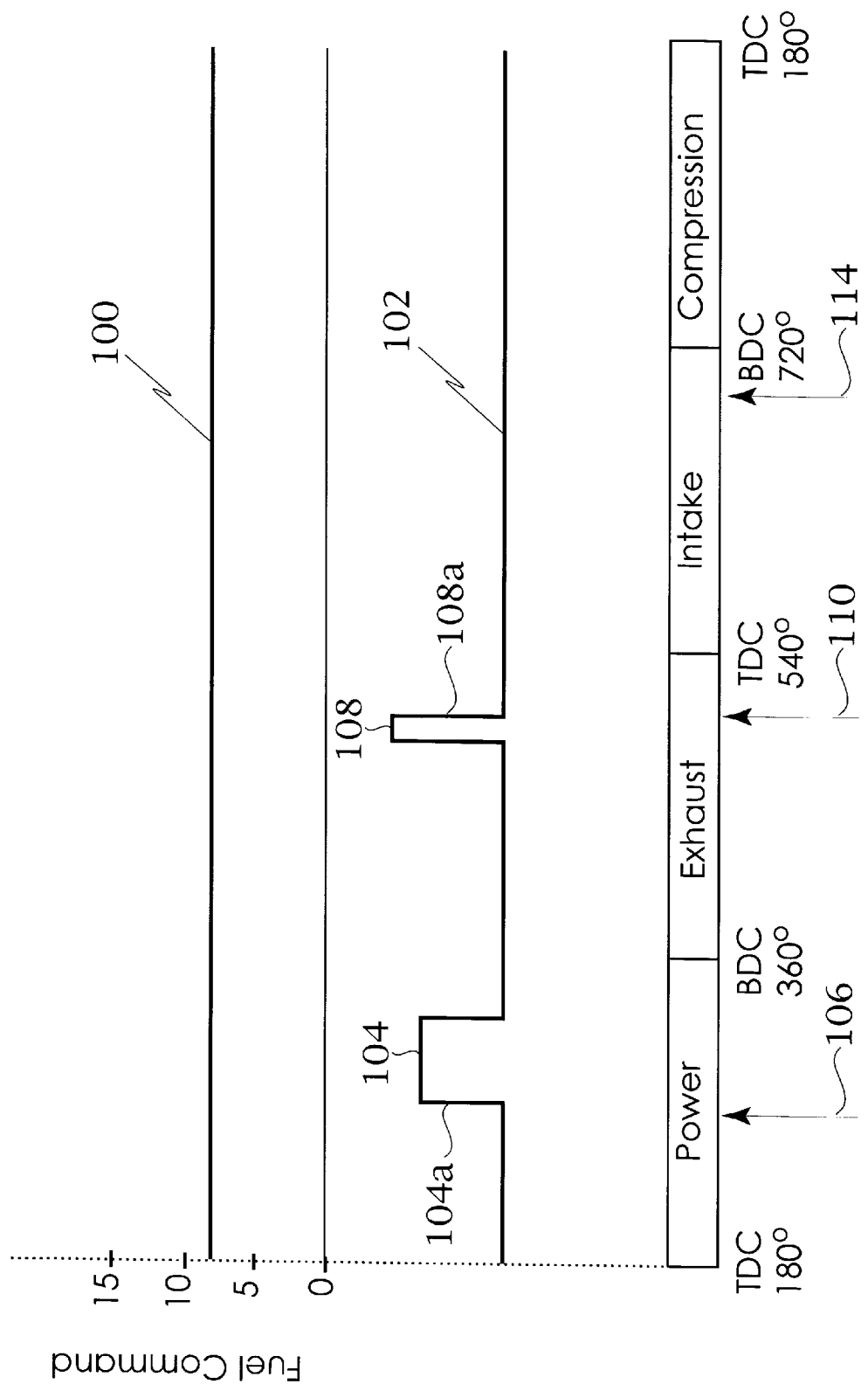
FIG. 3 is a schematic illustration showing the value of a total calculated pulse width and the firing of a series of pulse fragments to a single fuel injector during a 720° fueling window for an engine operating under steady-state conditions.
Figure 4:
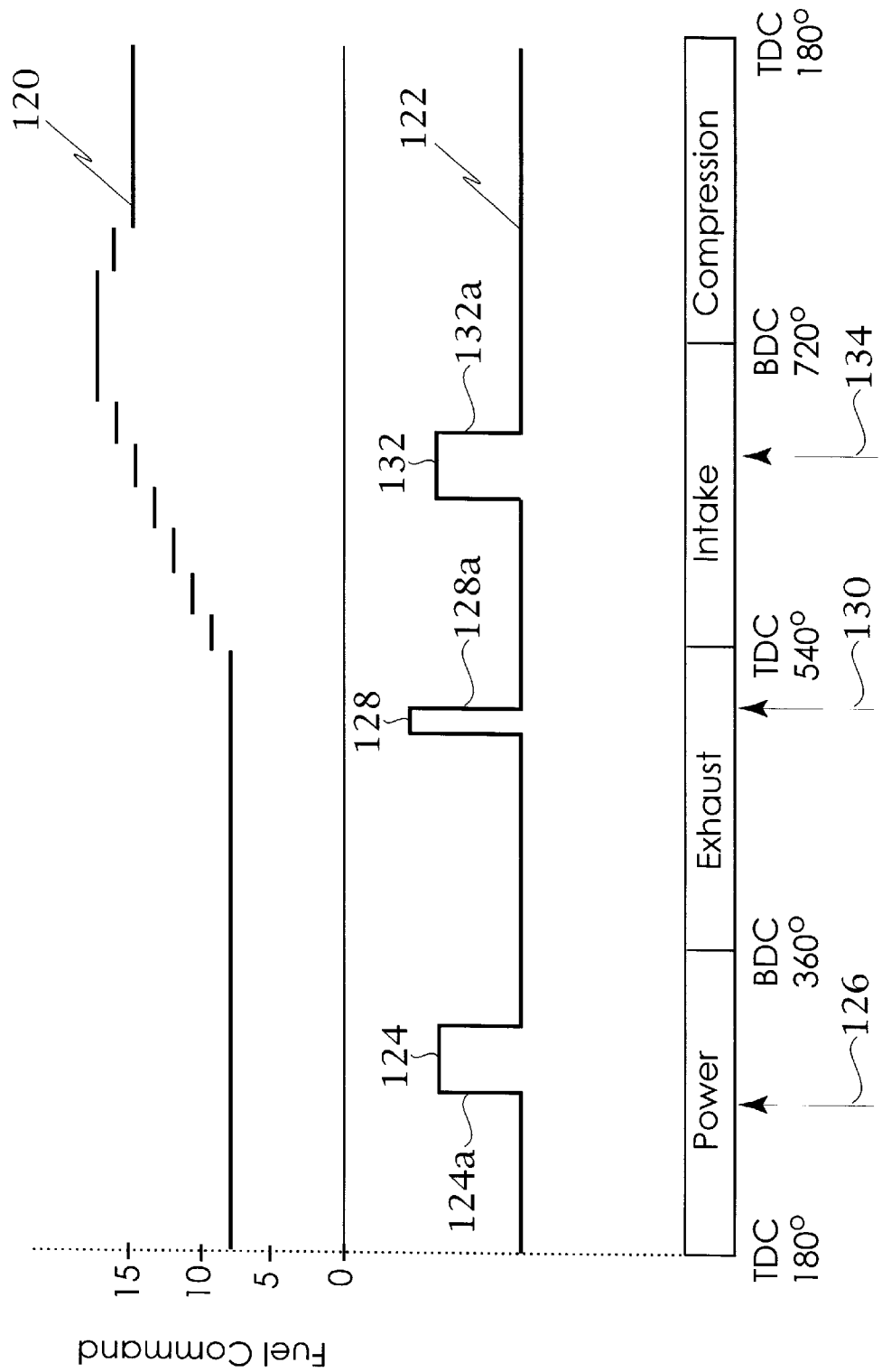
FIG. 4 is a schematic illustration showing the value of a total calculated pulse width and the firing of a series of pulse fragment to a single fuel injector during a 720° fueling window for an engine operating under an increasing fueling requirement.
Figure 5:
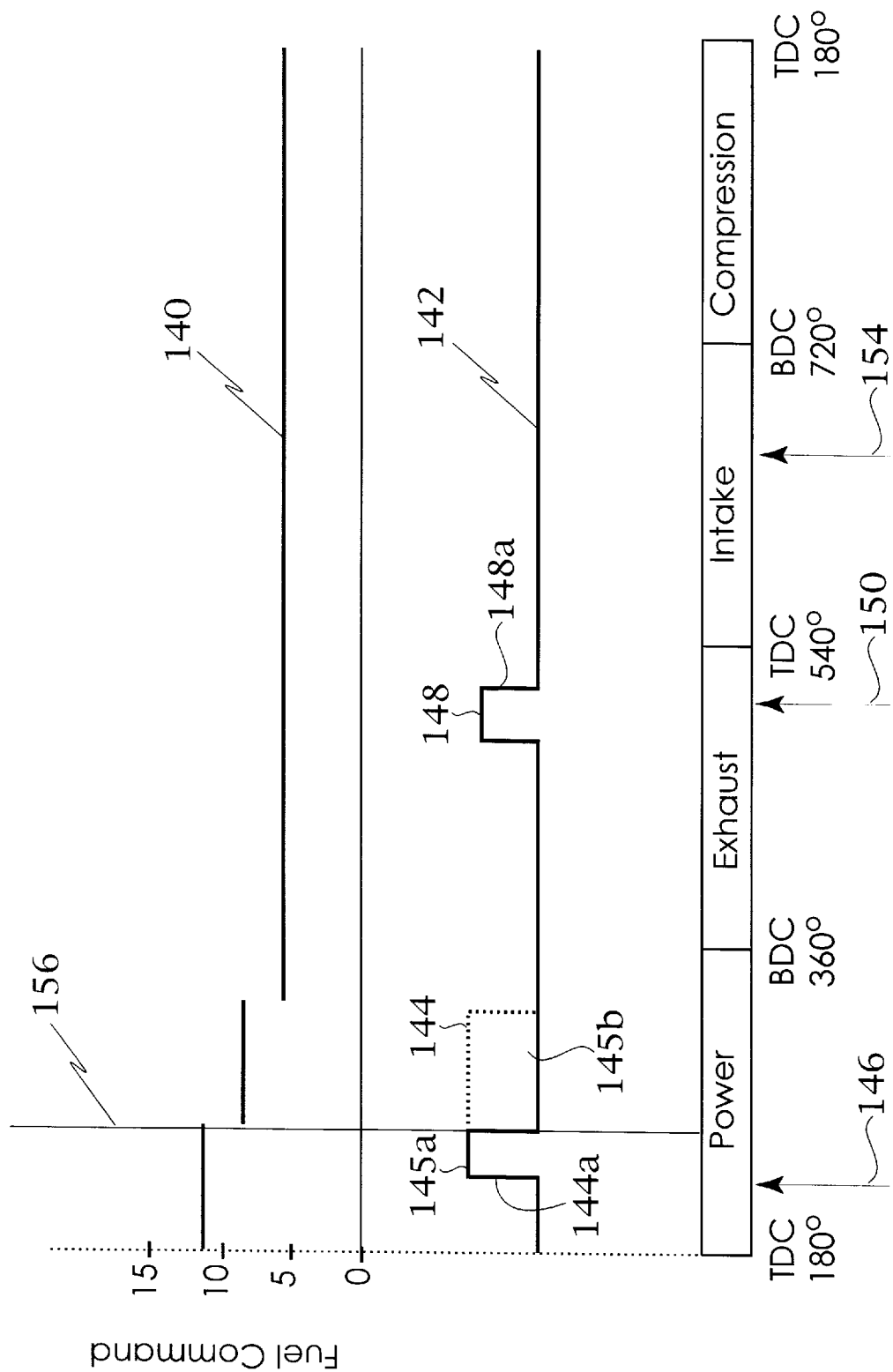
FIG. 5 is a schematic illustration showing the value of a total calculated pulse width and the firing of a series of pulse fragments to a single fuel injector during a 720° fueling window for an engine operating under a decreasing fueling requirement.

FIGS. 3 through 5 are schematic representations which show the value of CPW as continuously calculated during one 720° fueling window and the corresponding pulse fragments that would be generated for an individual fuel injector 2 under the method of the present invention. FIG. 3 is representative of an engine operating under steady-state conditions throughout the 720° fueling window. Line 100 represents the relative value of CPW at any particular crankshaft position. As the engine is operating at a constant speed and under a constant load throughout the 720° fueling window, the fueling requirements of the engine do not change and the value of CPW remains constant.

Line 102 is a schematic representation of the corresponding pulse fragments that are fired to an individual injector in this 720° fueling window. Pulse 104 represents the first pulse fragment fired in the fueling window (i.e., PW1); PW1 is delivered so that its leading edge 104*a* coincides with crankshaft position 106 which corresponds to the value of ANG1. Pulse 108 represents the second pulse fragment fired (i.e., PW2). PW2 is delivered so that its trailing edge 108*a* coincides with crankshaft position 110 which corresponds to the value of ANG2. The crankshaft position relating to the position where the third pulse is fired, ANG3, is noted at 114. Under the methodology of the present invention, the operation of the engine under steady-state conditions causes the delivery of fuel to be skewed such that only the first two pulses are used to deliver fuel. Although a pulse is not shown in this location, it should be apparent to those skilled in the art that a pulse having a width less than or equal to the value of BATOFF could be delivered at ANG3 without causing fuel injector 2 to dispense fuel.

FIG. 4 is representative of an engine operating under steady-state conditions through a portion of the 720° fueling window and then experiencing an increasing fueling requirement. Line 120 represents the relative value of CPW at any particular crankshaft position and line 122 schematically represents the corresponding pulse fragments that are fired to an individual injector. Pulses 124 & 128 represent the first and second pulse fragments respectively (i.e., PW1 & PW2). As the engine is operating under steady-state conditions when the widths of these pulses are calculated, this portion of the figure is similar to that of FIG. 3. In contrast to FIG. 3, however, the engine is subjected to an increasing fueling requirement at a point after the delivery of PW2. In response, the magnitude of CPW increases and the methodology uses the third pulse fragment to cause the fuel injector 2 to dispense fuel. The delivery of this third pulse fragment is timed to occur so that the trailing edge 132*a* of the pulse fragment corresponds to a crankshaft position coinciding with ANG3.

FIG. 5 is representative of an engine that is operated under steady-state conditions through a portion of the 720° fueling window, subjected to a decreasing fueling requirement for another portion of the fueling window and then operated under steady-state condition having reduced fuel requirements for the remainder of the fueling window. Line 140 represents the relative value of CPW at any particular crankshaft position and line 142 schematically represents the corresponding pulse fragments that are fired to an individual injector. Pulse 144 corresponds to the first pulse fragment (i.e., PW1) whose width was calculated from the engine operating conditions that were related to the initial steady-state operation of the engine. In the example provided, the delivery of PW1 is initiated such that its leading edge 144*a* corresponds to a crankshaft position coinciding with ANG1. However, during the delivery of PW1, the mode flag is set, causing the termination of the delivery of PW1 at a crankshaft position corresponding with line 156. The theoretical width of the pulse fragment, APW1, is then reset to reflect the actual amount of fuel delivered by the injector by the first pulse fragment. Subsequent to ANG1 but before delivery of PW2, the engine is caused to operate under the fueling requirements of the second steady-state condition and the mode flag is reset. It should be apparent to those skilled in the art that any number of criteria could be used to reset the mode flag and that steady-state operation should not be held to comprise the sole criteria used to reset the mode flag. The second pulse fragment, PW2, is then calculated and delivered in the manner described in conjunction with FIG. 3. Note that since the engine is operating under steady-state conditions from a point prior to the calculation of PW2 through the end of the 720° fueling window, the methodology does not require that the third pulse fragment be used to deliver fuel to the individual cylinder 3. As such, the third pulse fragment is not schematically shown.

The foregoing discussion discloses and describes various embodiments of the present invention. One skilled in the art will readily recognize from such discussion, and from the accompanying drawings and claims, that various changes, modifications and variations can be made without departing from the true spirit, proper scope and fair meaning as defined in the subjoined claims.

What is claimed is:

1. In a fuel injection system for an internal combustion engine having at least one cylinder, a throttling device connected to said engine to allow or prevent air to each of said cylinders; a fuel source; at least one fuel line connected to said fuel source; at least one fuel injector for each of said cylinders, each fuel injector connected to said fuel line for delivering fuel to a corresponding cylinder; sensors for detecting an operating condition of said engine; and an electronic control unit (ECU) electrically connected to said sensors and each of said fuel injectors for receiving signals from said sensors and outputting a variable number of pulse fragments to fire said each of said fuel injectors, said number of pulse fragments ranging from zero to a predetermined maximum, a method for determining the number of pulse fragments to be delivered and a width of each of said pulse fragments comprising the steps of:

continuously calculating a total pulse width based upon said engine operating condition;

acquiring a first current value of said total pulse width;

calculating a width of a first pulse fragment to be delivered based upon said first current value;

delivering said first pulse fragment if said first pulse fragment width exceeds a first predetermined width value;

acquiring a next current value of said total pulse width;

calculating a width of a next pulse fragment to be delivered based upon said next current value;

delivering said next pulse fragment if said next pulse fragment width exceeds a predetermined width value;

repeating the above three steps for each of a remaining pulse fragment in a fueling window;

repeating all of the above steps for each subsequent fueling window.

2. The method of claim 1 wherein the width of three pulse fragments are calculated.

3. The method of claim 1 wherein an advance fraction is used in the step of calculating said width of said first pulse fragment, said advance fraction being a predetermined number between 0 and 1 and selected on a basis of one or more aspects of said current engine operating condition.

4. The method of claim 3 wherein the width of the first pulse fragment is based upon a value of said advance fraction multiplied by a value of said first current value of said total pulse width.

5. The method of claim 1 wherein the step of calculating said width of said first pulse fragment also includes the calculation of a minimum pulse width for each of said pulse fragments to be delivered.

6. The method of claim 5 further comprising the steps of:

comparing said width of said pulse fragment to be delivered with said corresponding minimum pulse width; and inhibiting the delivery of said pulse fragment if the width of said pulse fragment does not equal or exceed said minimum pulse width;

wherein each of the above steps is performed prior to the delivery of each pulse fragment.

7. The method of claim 5 further comprising the steps of:

comparing said width of said pulse fragment to be delivered with said corresponding minimum pulse width; and delivering a pulse fragment equal to said minimum pulse width if the width of said pulse fragment does not equal or exceed said minimum pulse width wherein each of the above steps is performed prior to the delivery of each pulse fragment.

8. The method of claim 1 wherein said ECU is further operable for setting a mode flag in response to a detection of a predetermined engine condition, said mode flag operable for causing the termination or suppression of the delivery of any pulse fragment fired contemporaneously with or subsequent to the setting of said mode flag.

9. The method of claim 1 wherein the step of calculating said width of said first pulse fragment also includes the calculation of a delivery angle for each of said pulse fragments to be delivered.

10. The method of claim 9 wherein the calculation of at least one of said delivery angles further includes an offset angle for reducing the magnitude of a standing wave in said fuel line.

11. The method of claim 1 wherein said value of said total pulse width is additionally based upon an amount of fuel dispensed during a current fueling window.

12. In a fuel injection system for an internal combustion engine having at least one cylinder; a throttling device connected to said engine to allow or prevent air to each of said cylinders; a fuel source; at least one fuel line connected to said fuel source; at least one fuel injector for each of said cylinders, each fuel injector connected to said fuel line for delivering fuel to a corresponding cylinder; sensors for detecting an operating condition of said engine; and an electronic control unit (ECU) electrically connected to said sensors and fuel injectors for receiving signals from said sensors and outputting a variable number of pulse fragments to fire said each of said fuel injectors, said number of pulse fragments ranging from zero to a predetermined maximum of three, said ECU operable for setting a mode flag in response to a detection of a predetermined engine condition, a method for determining the number of pulse fragments to be delivered and a width of each of said pulse fragments comprising the steps of:

continuously calculating a total pulse width based upon said engine operating conditions;

acquiring a first current value of said total pulse width;

calculating a width of a first pulse fragment to be delivered based upon said first current value, a first, second and third minimum pulse width and a first, second and third delivery angle;

comparing said width of said first pulse fragment to be delivered with a corresponding first minimum pulse width;

delivering said first pulse fragment according to said first delivery angle if said first pulse fragment width exceeds a first predetermined width value unless or until said mode flag has been set;

acquiring a second current value of said total pulse width;

calculating a width of a second pulse fragment to be delivered based upon said second current value;

comparing said width of said second pulse fragment to be delivered with a corresponding second minimum pulse width;

delivering said second pulse fragment according to said second delivery angle if said second pulse fragment width exceeds a second predetermined value unless or until said mode flag has been set;

acquiring a third current value of said total pulse width;

calculating a width of a third pulse fragment to be delivered based upon said third current value;

comparing said width of said third pulse fragment to be delivered with a corresponding third minimum pulse width;

delivering said third pulse fragment according to said third delivery angle if said third pulse fragment width exceeds a third predetermined value unless or until said mode flag has been set; and repeating all of the above steps for each of a subsequent fueling window.

13. The method of claim 12 wherein the calculation of at least one of said delivery angles further includes an offset angle for reducing the magnitude of a standing wave in said fuel line.

14. The method of claim 12 wherein said value of said total pulse width is additionally based upon an amount of fuel dispensed during a current fueling window.

15. The method of claim 12 wherein said mode flag is set in response to a decreasing fueling requirement.

* * * * *